United States Patent [19]

Ziller

[11] Patent Number: 4,767,534
[45] Date of Patent: Aug. 30, 1988

[54] PLATE FILTER FOR FILTERING LIQUIDS

[75] Inventor: Josef Ziller, Waldstetten, Fed. Rep. of Germany

[73] Assignee: Schenk Filterbau Gesellschaft mit beschränkter Haftung, Waldstetten, Fed. Rep. of Germany

[21] Appl. No.: 896,385

[22] Filed: Aug. 13, 1986

[30] Foreign Application Priority Data

Aug. 20, 1985 [DE] Fed. Rep. of Germany ....... 3529706

[51] Int. Cl.$^4$ .............................................. B01D 33/26
[52] U.S. Cl. ..................................... 210/331; 210/347
[58] Field of Search ................. 210/330, 331, 345–347

[56] References Cited

U.S. PATENT DOCUMENTS 4,243,536 1/1981 Prölss ................................. 210/331
4,322,295 3/1982 Brokhage ........................... 210/331
4,587,017 5/1986 Christophe et al. ................ 210/345

Primary Examiner—Ivars Cintins
Attorney, Agent, or Firm—Becker & Becker, Inc.

[57] ABSTRACT

The proposed plate filter is provided for filtering liquids, such as wine, beer, or liquid chemicals, and is provided, in a tank, with plate-like filter elements that are disposed one above the other, and with a central hollow shaft. Also provided is at least one vertical feed line from which feed channels branch off to the filter elements. The feed line is located in the inner region of the filter elements, and the radially arranged feed channels are directed from the inside outwardly toward the filter elements.

19 Claims, 3 Drawing Sheets

PLATE FILTER FOR FILTERING LIQUIDS

BACKGROUND OF THE INVENTION

1. FIELD OF THE INVENTION

The present invention relates to a plate filter for filtering liquids, especially wine, beer, or liquid chemicals, including a tank in which plate-like filter elements are disposed one above the other, a hollow shaft that extends through the center of the filter elements, and at least one vertical feed line from which feed channels branch off to the filter elements.

2. DESCRIPTION OF THE PRIOR ART

With known plate filters of this general type, a plurality of filter elements are provided that are disposed one above the other on a central shaft. This shaft can be driven by means of a motor in order to cleanse the filter elements. The liquid that is to be filtered (the so-called unfiltered material) passes from the outside, i.e. from the periphery of each filter element, inwardly toward the center of the filter elements, where the cleansed liquid is withdrawn by appropriate outlets. With these heretofore known plate filters, there is the drawback that the feed of the unfiltered material from the outside of the filter elements inwardly does not take place uniformly, so that material does not flow uniformly to the individual filter elements in the desired manner. A particular drawback is that the filter aid, for example diatomite, that is mixed with the unfiltered material, is predominantly deposited on the periphery, i.e. in the outer zones, of the individual filter elements as the material flows from the outside into the individual filter elements due to the sedimentary property of this additive. As a result, a nonuniform coating of the individual filter elements takes place in such a way that more filtrate is deposited in the outer zones than in the inner zones.

Furthermore, due to nonuniform inward flow of the unfiltered material from the outside, nonuniform depositing or even partial separating or rinsing of the filter mass itself can occur, as a result of which a uniformity of the filtering process per unit of surface area/filter surface is not assured, which can have a disadvantageous effect upon the useful life of the filter and the quality of the filtering process. The nonuniform deposition of the expensive filter aid additionally leads to a very incomplete utilization of the filter aid, so that the filtering process as a whole has an unfavorable effectiveness.

It is an object of the present invention to further improve a plate filter of the aforementioned general type in such a way that each individual filter element is substantially uniformly supplied with the liquid that is to be filtered, and a better utilization of the filter aid, as well as a higher filtration effectiveness, is achieved.

SUMMARY OF THE INVENTION

This object is inventively realized in that each of the feed lines extends substantially parallel to the hollow shaft and is provided in the radially inner region of the filter elements; and wherein the feed channels are arranged in a radially extending manner, with each feed channel extending radially outwardly from a given feed toward the filter elements.

BRIEF DESCRIPTION OF THE DRAWINGS

Preferred embodiments and developments of the present invention, as well as further advantages and important details thereof, can be gathered from the features of the dependent claims, the subsequent description, and the drawings, which schematically illustrate preferred exemplary embodiments. Shown are:

DESCRIPTION OF PREFERRED EMBODIMENTS

Figure 1:
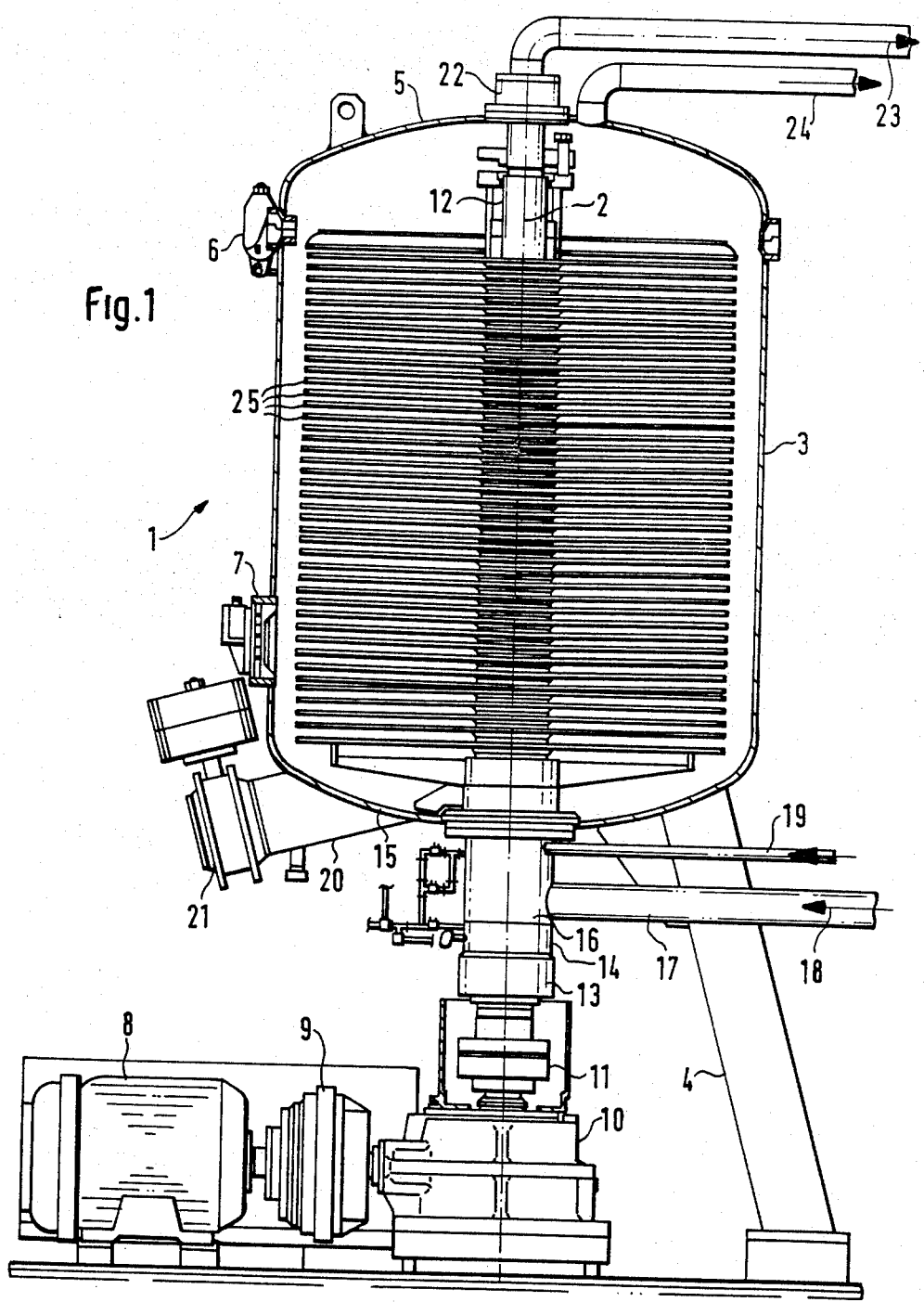
FIG. 1 that is a partially sectioned side view of one inventive plate filter.

The plate filter 1 illustrated in the drawing is provided for filtering liquids, such as wine, beer, liquid chemicals, and the like, and includes a tank 3 that has a vertical axis 2 and that is disposed on the legs 4 of a support frame. The tank 3 is provided with a removable cover 5 that is tightly secured via retaining clamps 6. Disposed on the side of the tank 3 is a sight or inspection glass 7.

Disposed below the tank 3 is an electric drive motor 8, after which are disposed a fluid coupling 9, a transmission gear 10 in the form of a miterwheel gearing, and a shaft coupling 11 for driving a hollow shaft 12 that extends through the tank 3 coaxial to the vertical axis 2. Disposed above the shaft coupling 11 is a bearing 13 for the hollow shaft 12, and a sealing housing 14 that adjoins an inlet connection 16 that is centrally disposed on the bottom 15 of the tank 3. Opening into the inlet connection 16 is a feed line 17 through which is conveyed the liquid that is to be filtered, namely the unfiltered material 18, as illustrated by the arrow. Also provided below the tank 3 is a discharge line 19 through which the residual filtrate is conveyed out for residual filtration. Additionally provided on the bottom 15 of the tank 3, for discharging the filtered filtrate residue and filter aids, is an outlet connection 20 that is directed downwardly at an angle and has a shutoff valve 21. A central outlet connection 22 is disposed at the top on the cover 5 of the tank 3; the liquid 23 separated-off during filtration is withdrawn through this outlet connection. At the same time, the component 22 forms a bearing for the hollow shaft 12. Furthermore disposed at the top on the cover 5 is a vent 24.

Figure 2:
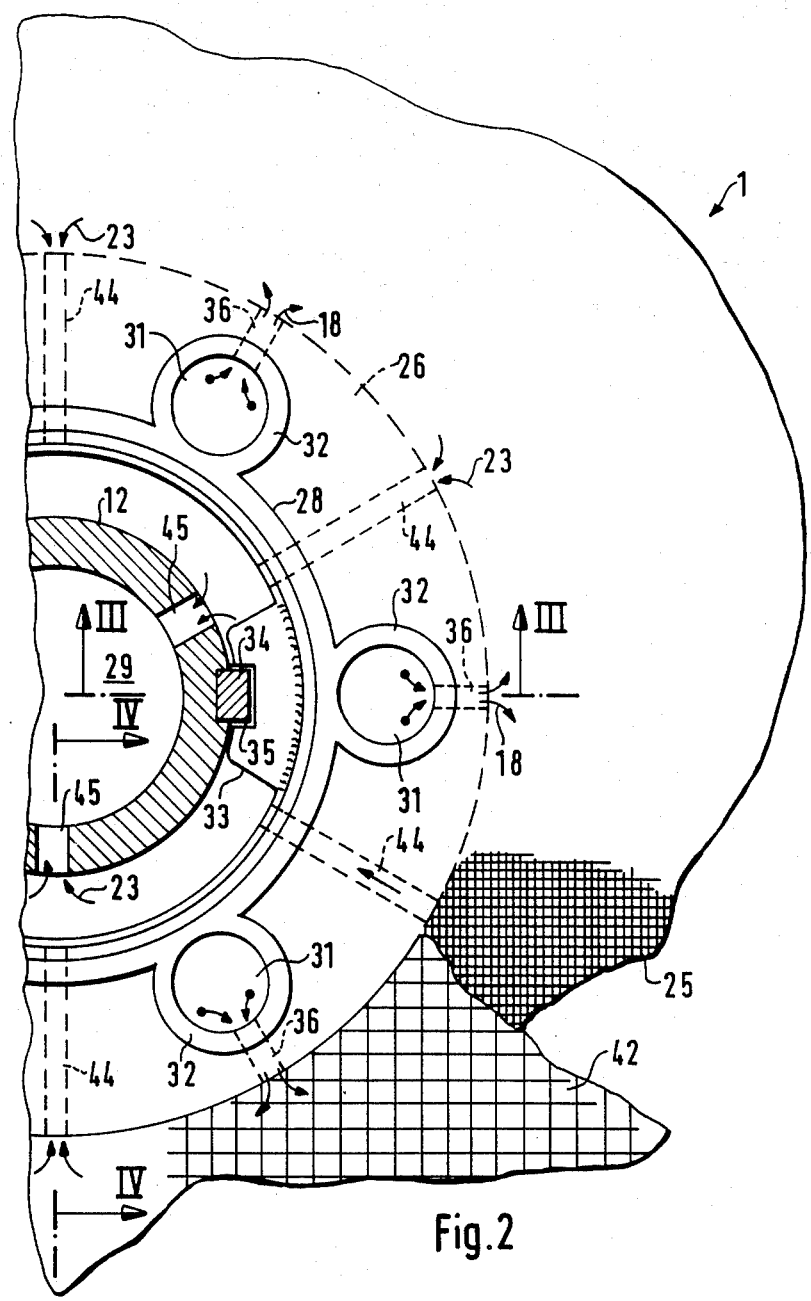
FIG. 2 that is a plan view of a sectioned portion of the plate filter of FIG. 1, FIG. 3 that is a sectioned partial side view of the plate filter taken along the section line III—III in FIG. 2, and FIG. 4 that is a sectional partial side view of the plate filter taken along the section line IV—IV in FIG. 2.
Figure 3:
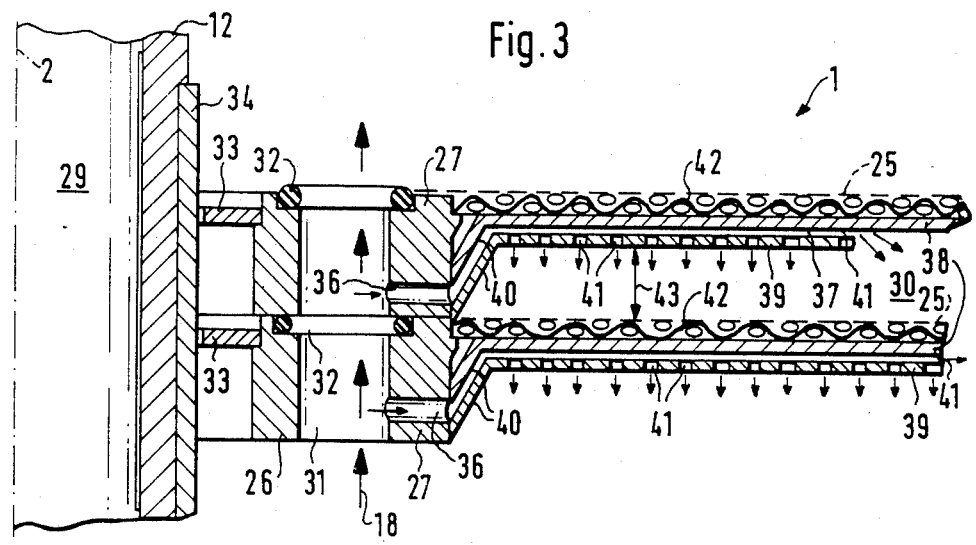
Figure 4:
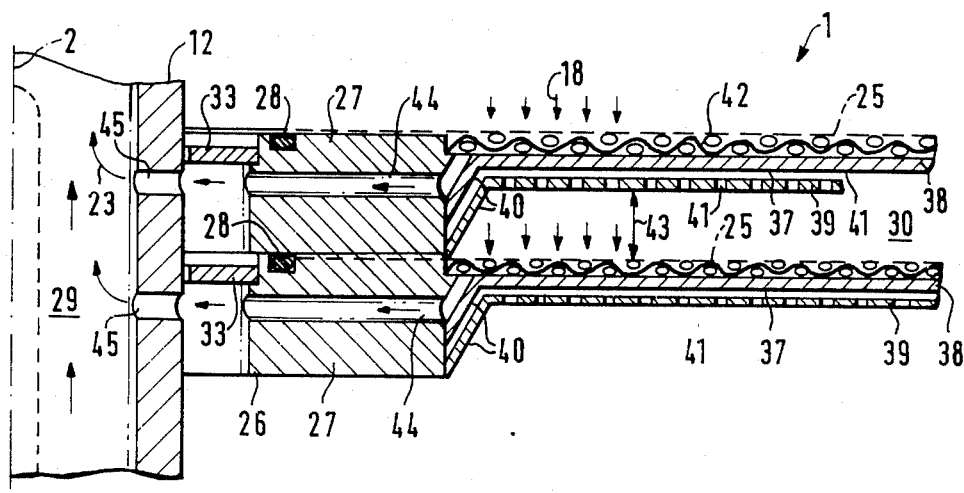

Located in the tank 3 are horizontally disposed, plate-like filter elements or media 25 that are made of a filter mesh of stainless steel and are disposed one above the other at a distance from one another. Passing through the filter elements are the hollow shaft 12 and a collar 26 that concentrically surrounds the hollow shaft and on which are disposed the filter elements 25, as can be seen in particular in FIGS. 2 to 4. The collars 26 are formed from individual annular members 27 that are coaxially placed one upon the other. Disposed between these annular members 27 that are placed upon one another, are respective sealing rings 28, whereby a seal is achieved between a clear space 29 formed in the hollow shaft 12, and the slurry space 30 in the region of the filter elements 25. Vertical feed lines 31 are formed in each collar 26, i.e. in the annular members 27. In the illustrated embodiment, a total of six feed lines 31 are preferably provided in the collar 26. These feed lines are symmetrically distributed, and extend parallel to the vertical axis 2. Between the annular members 27 that are placed one upon the other, each of the feed lines 31 is surrounded by an O-type ring 32 that is disposed in the same plane as is the sealing ring 28, and is preferably integrally formed in one piece with the latter.

Disposed on the inner side of the annular members 27 that form the collar 26 is at least one tongue 33 that butts against the outer periphery of the hollow shaft 12. The collar 26 is coupled with the hollow shaft 12 via an adjusting key 34 that extends into a groove 35 of the tongue 33, and into a groove-like recess of the hollow shaft 12. This also achieves a centering and an aligned orientation of the annular members 27 with the feed lines 31 formed therein and with the filter elements 25.

Formed in the annular members 27 are feed channels 36 which are directed outwardly toward the filter elements 25 from the feed lines 31, which are formed in the collar 26 and thus extend vertically in the inner region of the filter elements 25. Just like the feed lines 31, the feed channels 36 are symmetrically distributed all the way around. Each of the feed channels 36 opens into an annular distribution chamber 37 that communicates with the outer periphery of the collar 26. The annular distribution chamber 37 is preferably delimited by two parallel, annular-disclike plates 38, 39 that are spaced from one another by knobby elements or the like to form the annular distribution chamber 37. Each of the two plates 38, 39 has a side edge 40 that is bent downwardly at an angle. The ends of the side edges are supported on projections or stepped recesses formed on the outer periphery of the collar 26. An annular outlet opening 41 is formed on that end region of the plates 38, 39 that is remote from the outer periphery of the collar 26. Further outlet openings 41 in the form of holes or slots can be formed in the lower plate 39.

Thus, pursuant to the inventive disclosure, from a flow standpoint the feed channels 36 are connected with outwardly directed distribution chambers 37, which in the illustrated embodiment are formed by the annular distribution chamber 37. In place of the arrangement of the annular distribution chamber illustrated in the exemplary embodiment, it is also possible to provide a plurality, e.g. six, of individual lines that are directed radially outwardly from the feed channels 36.

Each filter element 25 rests upon a spacer 42 which, for permeability and withdrawal of a filtered liquid, can preferably be embodied as a meshed screen, or selectively as a slotted knobby sheet. The spacer 42 that carries the filter element 25 is itself disposed upon the upper plate 38 that helps delimit the annular distribution chamber 37. Disposed between the plate 39, which delimits the bottom of the annular distribution chamber 37, and the filter element 25 disposed therebelow, is a somewhat larger gap or space 43, the so-called filtration residue space, so that there is sufficient free space for the unfiltered material 18 that leaves the annular distribution chamber 37 to spread out on the filter element 25 disposed therebelow.

Additionally symmetrically distributed in the annular members 27 of the collar 26 are return channels 44 for the liquid that is separated-off or cleansed by the filter element 25. The return channels 44 are disposed in a plane below the spacer 42, and are alternately offset relative to the feed channels 36 (see FIG. 2). The return channels 44 extend from the outer periphery of the collar 26 to the inner side thereof. As can be seen from FIGS. 2 and 4, radial bores 45 are additionally provided in the wall of the hollow shaft 12 for the return of the filtered liquid. The liquid coming from the return channels 44 is conveyed through these bores into the clear space 29 in the interior of the hollow shaft 12. In the clear space 29, the filtered liquid is conveyed upwardly to the outlet connection 22.

With the present exemplary embodiment, the unfiltered material 18 is introduced from below, through the inlet connection 16, into the symmetrically distributed, vertical feed lines 31, is conveyed in an upward direction, and branching-off horizontally therefrom is conveyed through the feed channels 36 and the annular distribution chambers 37 that communicate therewith onto the surface of the filter elements 25. However, it is also within the scope of the present invention to introduce the unfiltered material 18 from above and to introduce it from above into the feed lines 31 provided centrally in the inner region of the filter elements 25. In this case, the withdrawal of the filtered liquid is then expediently effected at the bottom of the tank 3. As a result of the feed distribution of the unfiltered material 18 as integrated in the inner region of the filter elements, the advantage is achieved that an optimum quantity distribution is assured via the balanced-out feed channels 36. In this connection, it is particularly advantageous if every filter element 25 at the same time is a feed distributor for the filter element 25 disposed therebelow. With the inventive plate filter 1, no uncontrolled flows occur outside the filter unit, in other words, beyond the slurry space 30, since the entire contents of the tank stagnate in the outer region of the filter unit. On the whole, with the proposed plate filter 1, it is possible to achieve a better utilization of the filter aid, and in addition a considerable increase in output from the previous approximately 4 to 5 hl/h to now approximately 10 to 15 hl/h.

The present invention is, of course, in no way restricted to the specific disclosure of the specification and drawings, but also encompasses any modifications within the scope of the appended claims.

What I claim is:

1. In a plate filter rotatable about a vertical axis for filtration of suspensions including a tank in which plate-like filter elements are disposed one above the other in a filter packet, a hollow shaft that has a vertical axis and extends through the center of said filter elements, and at least one vertical feed line from which feed channels branch off to each of said filter elements, the improvement wherein a given feed line for the suspension extends substantially parallel to said vertical axis of said hollow shaft and is provided in a radially inner region of said filter elements, and wherein said feed channels are respectively arranged in a symmetrically-distributed branched configuration directed in radially extending manner relative to said filter elements, with each of said feed channels extending radially outwardly from a given feed line toward said filter elements; and said filter elements comprising means therewith forming upper and lower plates, said plates having an outwardly directed distribution chamber formed therebetween as well as having flow connection therewith for outwardly directed distribution via said feed channels, said distribution chamber being located below said filter elements and having at least one outlet opening for uniform spreading and distribution of the suspension upon the filter element located therebelow.

2. A plate filter according to claim 1, in which said filter elements are disposed on a collar that concentrically surrounds said hollow shaft, with said at least one feed line being formed in said collar.

3. A plate filter according to claim 2, in which said collar of said filter elements is provided with a plurality of parallel feed lines, with said feed lines and said branched-off feed channels being disposed symmetrically relative to said hollow shaft.

4. A plate filter according to claim 3, in which each of said filter elements is provided with an annular distribution chamber that communicates with the radially outer periphery of said collar, with said feed channels opening into said annular distribution chamber.

5. In a plate filter rotatable about a vertical axis for filtration of suspensions including a tank in which plate-like filter elements are disposed one above the other, a hollow shaft that has a vertical axis and extends through the center of said filter elements, and at least one vertical feed line from which feed channels branch off to said filter elements, the improvement wherein a given feed line extends substantially parallel to said vertical axis of said hollow shaft and is provided in a radially inner region of said filter elements, and wherein said feed channels are respectively arranged in a radially extending manner, with each of said feed channels extending radially outwardly from a given feed line toward said filter elements, said filter elements being disposed on a collar that concentrically surrounds said hollow shaft, with said at least one feed line being formed in said collar, said collar of said filter elements being provided with a plurality of parallel feed lines, with said feed lines and said branched-off feed channels being disposed symmetrically relative to said hollow shaft, each of said filter elements being provided with an annular distribution chamber that communicates with the radially outer periphery of said collar, with said feed channels opening into said annular distribution chamber, each of said annular distribution chambers being formed between two spaced-apart plates that extend substantially parallel to said filter element, with the latter being supported by an upper one of said plates.

6. A plate filter according to claim 5, in which radially inner sides of said plates that form said annular distribution chamber are bent off at an angle and are supported against the radially outer periphery of said collar.

7. A plate filter according to claim 6, in which each filter element/plates/ and annular distribution chamber unit is provided with outlet opening means.

8. A plate filter according to claim 7, which includes a liquid-permeable, holed spacer that is interposed between each filter element and the associated upper plate of said annular distribution chamber, with said filter element being supported on said spacer, and said spacer being supported on said upper plate; and which includes a gap between said lower plate and the filter element disposed therebelow.

9. A plate filter according to claim 8, in which said collar has formed therein, in respective planes disposed at a level below said spacer of an associated filter element, for each of the latter at least one return channel for receiving liquid filtered thereby.

10. A plate filter according to claim 9, in which said collar has formed therein a plurality of said return channels that are disposed symmetrically relative to said hollow shaft, and that alternate with said feed channels.

11. A plate filter according to claim 10, in which said hollow shaft has an interior clear space, and, defining the latter, a wall that is provided with radially extending through-bores to permit filtered liquid to pass from said return channels into said clear space.

12. A plate filter according to claim 11, in which said collar of said filter elements is formed by annular members that are disposed one above the other, with said vertical feed lines passing through said annular members parallel to said vertical axis, and with each of said annular members being provided with at least one of said branched-off feed channels and, offset relative thereto, at least one of said return channels.

13. A plate filter according to claim 12, in which said gap between each lower plate and the filter element disposed therebelow forms a slurry space for liquid to be filtered that is received from said annular distribution chamber via said outlet opening means; and in which, to seal off said clear space relative to said slurry space, sealing rings are disposed between adjacent ones of said superimposed annular members of said collar.

14. A plate filter according to claim 13, in which, to seal off said vertical feed lines, O-type rings that surround the latter are disposed between adjacent ones of said superimposed annular members of said collar.

15. A plate filter according to claim 14, in which, between a given two adjacent annular members, said O-type rings are integrally formed in one piece with said sealing rings.

16. A plate filter according to claim 15, which includes, on the radially inner side of a given annular member of said collar, at least one tongue that extends in the direction toward said hollow shaft for centering and aligning the orientation of said annular members and said filter elements.

17. A plate filter according to claim 16, in which each of said tongues is provided with a groove; and which includes at least one adjusting key that extends into said grooves of said tongues for coupling said annular members with said hollow shaft.

18. A plate filter according to claim 17, in which the bottom of said tank is provided with inlet connection means for receiving liquid that is to be filtered and distributing the latter from below to said vertical feed lines, which are in the form of risers; and in which the top of said tank is provided with central outlet connection means for receiving filtered liquid from said clear space of said hollow shaft.

19. In a plate filter for filtering liquids, including a tank in which plate-like filter elements are disposed one above the other, a hollow shaft that has a vertical axis and extends through the center of said filter elements, and at least one vertical feed line from which feed channels branch off to said filter elements, the improvement wherein a given feed line extends substantially parallel to said vertical axis of said hollow shaft and is provided in a radially inner region of said filter elements, and wherein said feed channels are respectively arranged in a radially extending manner, with each of said feed channels extending radially outwardly from a given feed line toward said filter elements, said filter elements being disposed on a collar that concentrically surrounds said hollow shaft, with said at least one feed line being formed in said collar, said collar of said filter elements being provided with a plurality of parallel feed lines, with said feed lines and said branched-off feed channels being disposed symmetrically relative to said hollow shaft, each of said filter elements being provided with an annular distribution chamber that communicates with the radially outer periphery of said collar, with said feed channels opening into said annular distribution chamber; each of said annular distribution chambers being formed between two spaced-apart plates that extend substantially parallel to said filter element, with the latter being supported by an upper one of said plates; radially inner sides of said plates that form said annular distribution chamber being bent off at an angle and being supported against the radially outer periphery of said collar;

each filter elements/plates/ and annular distribution chamber unit being provided with outlet opening means;

a liquid-permeable, holed spacer that is interposed between each filter element and the associated upper plate of said annular distribution chamber, with said filter element being supported on said spacer, and said spacer being supported on said upper plate; and a gap between said lower plate and the filter element disposed therebelow; said collar having formed therein, in respective planes disposed at a level below said spacer of an associated filter element, for each of the latter at least one return channel for receiving liquid filtered thereby, said collar having formed therein a plurality of said return channels that are disposed symmetrically relative to said hollow shaft, and that alternate with said feed channels;

said hollow shaft having an interior clear space, and, defining the latter, a wall that is provided with radially extending through-bores to permit filtered liquid to pass from said return channels into said clear space; said collar of said filter elements being formed by annular members that are disposed one above the other, with said vertical feed lines passing through said annular members parallel to said vertical axis, and with each of said annular members being provided with at least one of said branched-off feed channels and, offset relative thereto, at least one of said return channels; said gap between each lower plate and the filter element disposed therebelow forming a slurry space for liquid to be filtered that is received from said annular distribution chamber via said outlet opening means; and, to seal off said clear space relative to said slurry space, sealing rings being disposed between adjacent ones of said superimposed annular members of said collar;

to seal off said vertical feed lines, O-type rings that surround the latter being disposed between adjacent ones of said superimposed annular members of said collar; between a given two adjacent annular members, said O-type rings being integrally formed in one piece with said sealing ring;

on the radially inner side of a given annular member of said collar, at least one tongue that extends in the direction toward said hollow shaft for centering and aligning the orientation of said annular members and said filter elements, each of said tongues being provided with a groove; and at least one adjusting key that extends into said grooves of said tongues for coupling said annular members with said hollow shaft; the bottom of said tank being provided with inlet connection means for receiving liquid that is to be filtered and distributing the latter from below to said vertical feed lines, which are in the form of risers; the top of said tank being provided with central outlet connection means for receiving filtered liquid from said clear space of said hollow shaft; said hollow shaft being rotatable about said vertical axis; a sealing housing and bearing means being provided on said tank, for said hollow shaft, below said inlet connection means; and including, for driving said hollow shaft, an electric drive motor, a fluid coupling, a miter-wheel transmission gear, and a shaft coupling.

* * * * *